Aug. 7, 1934.  T. E. OBRIG  1,969,622
OPHTHALMIC LENS
Filed Oct. 23, 1933
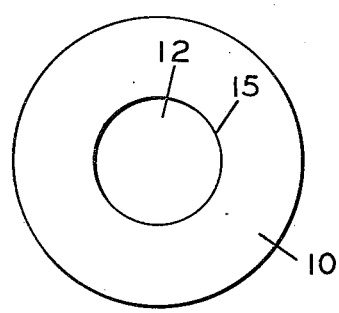 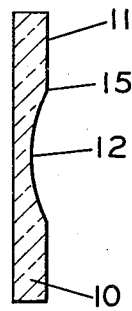
FIG. 1  FIG. 2
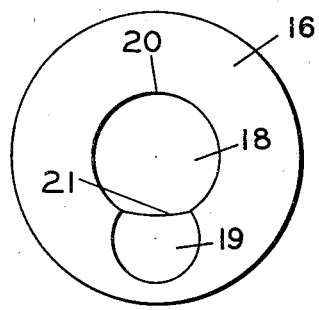 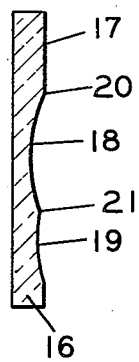
FIG. 3  FIG. 4
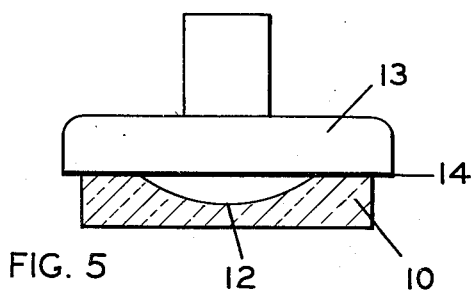
FIG. 5
THEODORE E. OBRIG
INVENTOR
BY
ATTORNEY Patented Aug. 7, 1934

1,969,622

UNITED STATES PATENT OFFICE 1,969,622

OPHTHALMIC LENS

Theodore E. Obrig, Greenwich, Conn., assignor to Gall & Lembke, Inc., New York, N. Y., a corporation of New York Application October 23, 1933, Serial No. 694,712

4 Claims. (Cl. 88—54)

This invention relates to opthalmic lenses. More particularly it has reference to ophthalmic lenses which have a relatively strong negative, or minus power. In order to reduce the weight of strong negative lenses, it has been proposed, for single vision lenses, to grind a spherical concavity, of the proper curvature, on a surface of a piece of glass. In such lenses of the prior art, the intersection of the spherical concavity with the surface, which is usually plano, is not clear, sharp and distinct since one surface gradually merges into the other along a more or less convex edge which surrounds the concavity. This rounded edge has a substantial area which produces spherical aberration so that the effective vision field is considerably reduced in size. Moreover, when such a lens is worn before the eye the convex merging edge causes troublesome reflections and produces a more or less bright annular band of light around the eye. Such lenses, which are known as lenticular lenses, are usually quite heavy and hence every effort must be made so as to provide maximum optical efficiency while still striving for a lens of minimum weight.

One of the objects of my invention is to provide an improved lens of the type described and a method of making the same. Another object is to provide a lenticular lens having a maximum optical performance and a minimum weight. A further object is to provide an improved lens of the type described having a plurality of merged spherical surfaces of different dioptric powers. These and other objects and advantages reside in certain novel features of construction, arrangement and combination of parts and in the method of constructing, arranging and combining the same, all as will hereinafter be more fully described and pointed out in the appended claims.

Referring to the drawing:

Fig. 1 is a face view of a single vision lens embodying my invention.

Fig. 2 is a vertical section thereof.

Fig. 3 is a face view of a multifocal lens embodying my invention.

Fig. 4 is a vertical section thereof.

Fig. 5 is a diagrammatic view illustrating my method of polishing lenses.

A preferred embodiment of my invention is disclosed in the drawing wherein 10 indicates a piece of glass which has suitable optical properties. The surfaces of the piece of glass may both be plano as shown in the drawing although the surfaces may also be toric or spherical in form. In one surface 11 there is ground and polished by well known methods a spherical depression or concavity 12 having a curvature which will provide the proper dioptric power. This depression or concavity has a diameter greater than that desired for the finished lens. The surface 12 is then ground and polished until the concavity has the desired diameter. The final polishing is done by means of a hard polisher, such, for example, as a suitable metal member 13 having a flat surface on which is cemented a cloth polishing member 14 impregnated with a hard wax. Rouge is applied in the usual manner, but since the polisher is hard and non-yielding it does not run down into the concavity 12. Hence the intersection 15 of the concavity 12 and the surface 11 is sharp and definite and entirely free from the rounded edge which characterizes lenses of the prior art.

Another modification of my invention is illustrated in Figs. 3 and 4 wherein 16 indicates a piece of glass having the surface 17 in which are ground and polished the two intersecting spherical concavities 18 and 19 having their curvatures chosen so as to provide the required dioptric powers for the distance and reading portions. In making this type of lens, the smaller concavity 19 is first ground and polished and then the larger concavity 18 is ground. The concavity 18 is polished by means of a hard wax polisher having the form of the concavity so that the dividing line 21 between the two concavities is rendered sharp and definite. The lens is then polished by the method illustrated in Fig. 5 so as to produce clear, sharp dividing lines 20 at the intersection of the concavities and the lens surface 17. This provides a bifocal lens in which the optical center of the reading portion is entirely independent of the distance prescription in case a plano or spherical surface is placed on the other side of the lens.

Since my lens has a clear, sharp dividing line around the concavity or concavities the entire area of the disc or concavity can be utilized for vision. This means that there is no useless band around the edge of the disc and hence any desired effective and useful field of vision of a given diameter can be provided with a smaller disc or concavity with my lens than with a lens of the prior art. A single vision lens embodying my invention will have a concavity or disc whose diameter is substantially 25 mm. for discs having a power ranging from zero to —15.00 D; a diameter of substantially 22 mm. for discs having a power of —15.00 D and up to —18.00 D and a diameter of 20 mm. for discs whose power is —18.00 D or higher. Since I can use a disc or concavity of a smaller diameter, my lens will be thinner and lighter in weight than the prior art lenses of the same power and vision field. Hence the lens can be fitted closer to the patient's eye and it can be kept in position easier than a heavier lens. It is to be understood that, if desired, spherical or cylindrical corrections can be ground on the side of the lens which does not carry a concavity. Furthermore, my lens, when worn by the patient, presents a neat appearance to an observer since the lens appears more like an ordinary type of spectacle lens. This feature is highly important from a cosmetic standpoint.

From the foregoing it will be apparent that I am able to attain the objects of my invention and provide an improved lenticular lens having one or more vision fields. Various modifications can obviously be made without departing from the spirit of my invention.

I claim:

1. A finished ophthalmic lens comprising a single piece of refractive material having a plurality of intersecting concavities formed on one face thereof, each of said concavities having a different radius of curvature, the dividing line between said concavities and face being sharp and definite whereby the entire area of each concavity affords a useful field of vision.

2. A finished ophthalmic lens comprising a single piece of refractive material having a plurality of intersecting spherical concavities formed on one face thereof, each of said concavities having a different curvature and a different diameter, the dividing lines between said concavities and between said concavities and said surface being definite and sharp.

3. A finished ophthalmic lens comprising a single piece of refractive material having a plurality of intersecting spherical concavities ground and polished on one face thereof, each of said concavities having a different curvature whereby distance and near vision fields are provided, the dividing line between the concavities and face being sharp and definite, the other face of said piece of refractive material having a uniform curvature throughout its area, the optical center of said near vision field being entirely independent of the prescription for the distance vision field.

4. An ophthalmic lens comprising a piece of refractive material having a spherical concavity ground and polished on one face thereof, the dividing line between said concavity and said face being sharp and definite whereby the entire area of said concavity affords a useful field of vision, said concavity having a diameter which is substantially 25 mm. for a lens whose power is less than —15.00 D; a diameter of 22 mm. for a lens whose power is —15.00 D and up to —18.00 D and a diameter of 20 mm. for a lens whose power is —18.00 D or higher.

THEODORE E. OBRIG.